(12) United States Patent
Vuori et al.

(10) Patent No.: US 9,305,701 B2
(45) Date of Patent: Apr. 5, 2016

(54) POWER TRANSFER

(75) Inventors: Petri Vuori, Salo (FI); Frank Borngräber, Weissenhorn (DE)

(73) Assignee: Nokia Technologies Oy, Espoo (FI)

( * ) Notice: Subject to any disclaimer, the term of this patent is extended or adjusted under 35 U.S.C. 154(b) by 294 days.

(21) Appl. No.: 13/976,224

(22) PCT Filed: Dec. 31, 2010

(86) PCT No.: PCT/IB2010/056148
§ 371 (c)(1),
(2), (4) Date: Sep. 19, 2013

(87) PCT Pub. No.: WO2012/090030
PCT Pub. Date: Jul. 5, 2012

(65) Prior Publication Data
US 2014/0028252 A1    Jan. 30, 2014

(51) Int. Cl.
*H01F 38/14* (2006.01)
*H02J 5/00* (2006.01)
*H02J 7/02* (2006.01)

(52) U.S. Cl.
CPC ............... *H01F 38/14* (2013.01); *H02J 5/005* (2013.01); *H02J 7/025* (2013.01)

(58) Field of Classification Search
CPC ....................................................... H02J 5/005
USPC ........................................................ 320/108
See application file for complete search history.

(56) References Cited

U.S. PATENT DOCUMENTS

2010/0039234 A1   2/2010   Soliven et al.
2010/0308665 A1   12/2010  Itkonen
2012/0146426 A1*  6/2012   Sabo ............................. 307/104

OTHER PUBLICATIONS

International Search Report for corresponding Patent Cooperation Treaty Application No. PCT/IB2010/056148, dated May 5, 2011, 5 pages.

* cited by examiner

*Primary Examiner* — Thuan Do
(74) *Attorney, Agent, or Firm* — Harrington & Smith (57) ABSTRACT

Apparatus comprises: an induction, coil (40) arrangement, the induction coil arrangement having a first set of at least one coil (41) with a first diameter and a second set of at least one coil (42) with a second diameter, the second diameter being different to the first diameter, a first tap (A) connected at a first end of the first set, a second tap (B) connected at connection common to a second end of the first set and a first end of the second set, and a third tap (C) connected at a second end of the second set; a power transmit arrangement (61) selectively connectable to a first combination of two of the first to third taps; and a power receive arrangement (62) selectively connectable to a second combination of two of the first to third taps, the second combination being different to the first combination.

12 Claims, 4 Drawing Sheets

POWER TRANSFER

RELATED APPLICATION

This application was originally filed as PCT Application No. PCT/IB2010/056148 filed Dec. 31, 2010.

FIELD

This invention relates to power transfer using induction coils.

BACKGROUND

It is known to communicate power wirelessly to mobile devices using induction and resonance. This allows devices such as mobile phones, smart phones, media players, etc., to be provided with charging power by placing the device on a charging mat. In the case of transferring power using induction, the charging mat and the device are provided with induction coils of similar coil diameters.

Devices manufactured by Nokia Corporation are designed with good power management and have relatively long periods between recharges. Even so, it is inconvenient when a device becomes unoperational because of insufficient battery power.

SUMMARY

A first aspect of this specification provides apparatus comprising:
  an induction coil arrangement, the induction coil arrangement having a first set of at least one coil with a first diameter and a second set of at least one coil with a second diameter, the second diameter being different to the first diameter, a first tap connected at a first end of the first set, a second tap connected at connection common to a second end of the first set and a first end of the second set, and a third tap connected at a second end of the second set;
  a power transmit arrangement selectively connectable to a first combination of two of the first to third taps; and
  a power receive arrangement selectively connectable to a second combination of two of the first to third taps, the second combination being different to the first combination.

The apparatus may comprise a controller configured to control switches connected between the power transmit arrangement and the power receive arrangement and the taps of the induction coil arrangement. The controller may be configured to respond a user input indicating that power transmission is required to activate the power transmit arrangement and to control the switches so as to connect the power transmit arrangement to the first combination of two of the first to third taps.

The taps of the first combination may be electrically adjacent to one another in the induction coil arrangement, and the taps of the second combination may be electrically adjacent to one another in the induction coil arrangement.

The induction coil arrangement may additionally include a third set of at least one coil with a third diameter, the third diameter being different to either of the first and second diameters, a first end of the third set being connected to the third tap and a second end of the third set being connected to a fourth tap, and the power transmit arrangement and/or the power receive arrangement may be selectively connectable to a third combination of two of the first to fourth taps, the third combination being different to the first and second combinations.

A second aspect provides portable communications device comprising apparatus as described above.

A third aspect provides a method of operating apparatus comprising:
  an induction coil arrangement, the induction coil arrangement having a first set of at least one coil with a first diameter and a second set of at least one coil with a second diameter, the second diameter being different to the first diameter, a first tap connected at a first end of the first set, a second tap connected at connection common to a second end of the first set and a first end of the second set, and a third tap connected at a second end of the second set;
  a power transmit arrangement; and
  a power receive arrangement, the method comprising:
  in response to receiving a user input indicating that power transmission is required:
  a) connecting the power transmit arrangement to a first combination of two of the first to third taps;
  b) operating the power transmit arrangement; and
  c) refraining from activating the power receive arrangement.

The method may further comprise:
  receiving a user input indicating one or more parameters for power transmission;
  monitoring power transmission;
  detecting that the parameters for power transmission have been reached; and
  in response to the detection, de-activating the power transmit arrangement.

The one or more parameters for power transmission may include a target battery charge level. The method may comprise indicating charging progress through a user interface.

The method may comprise, in response to determining that inductive power reception is required:
  a) connecting the power receive arrangement to a second combination of two of the first to third taps, the second combination being different to the first combination;
  b) operating the power receive arrangement; and
  c) refraining from activating the power transmit arrangement.

The method may comprise establishing communication between the apparatus and an external device, and using information received from the external device in controlling the power transmit arrangement.

BRIEF DESCRIPTION OF THE DRAWINGS

Embodiments of the invention will now be described, by way of example only, with reference to the accompanying drawings, in which.

DETAILED DESCRIPTION OF THE EMBODIMENTS

Figure 1A:
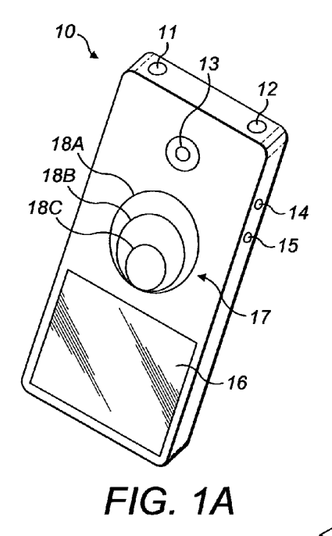
FIG. 1A is a schematic diagram illustrating a device according to exemplary aspects, the device being a mobile phone.

FIG. 1 shows a device 10 according to various embodiments. The device 10 in this example is a mobile phone or smart phone. Alternatively, it could be any other portable device such as a personal media player, a personal digital assistant, laptop, notebook, netbook, tablet computer etc. The device 10 is battery powered and may be hand portable.

FIG. 1A is a rear perspective view of the device. Shown in FIG. 1A is a rear face, part of a top face and part of a side face. The top face is shown as including an on/off switch 11 and a headphone socket 12. On the side face are provided first and second keys 14, 15. These have a primary function of allowing volume control, although they may be used for other purposes, for instance to zoom in and out when the device is in a camera or gallery mode.

On the rear face of the device 10 is a camera lens 13, a removable panel 16 and an induction coil location marker 17.

The removable panel 16 may allow access to an internal battery, and may also provide access to an internal battery, and may also provide access to a SIM card and/or a removable memory card.

The induction coil location marker 17 is provided approximately centrally on the rear face of the device 10. However, this is merely illustrative. The induction coil location marker 17 indicates a location within the device of an induction coil, which will be described in more detail below. The induction coil location marker 17 includes first to third location markers 18A to 18C. These each take the form of a circle, and each of the markers 18A to 18C is of a different size. In this example, the circles constituting the coil location markers 18A to 18C are eccentric and contact each other at a common point, although the largest location marker 18A fully encompasses the smaller markers 18B and 18C.

Figure 1B:
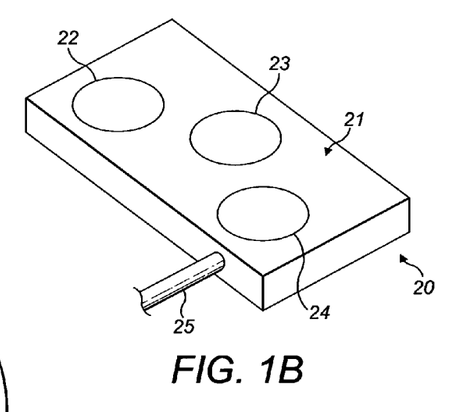
FIG. 1B is a schematic diagram of a charging mat usable with the FIG. 1A device.

A charging mat or charging pad 20 is shown in FIG. 1B. An upper surface 21 of the charging mat is provided with first to third coil location markers 22 to 24. These indicate to users where devices need to be placed in order to be charged by the charging mat. Extending from a side face of the charging mat 20 is a power cable 25. This allows the charging mat 20 to be connected to a source of mains power, or some other source or electrical power.

Figure 1C:
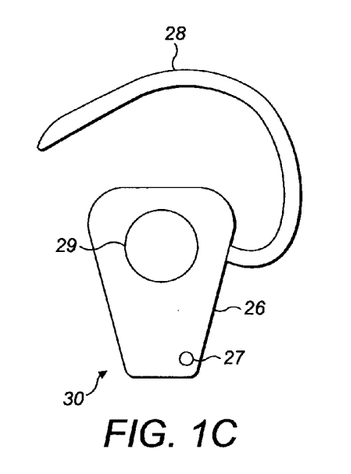
FIG. 1C is a schematic diagram of a wireless headset device usable with the FIG. 1A device.

FIG. 1C illustrates a wireless accessory device. In this example the device 30 is a Bluetooth™ headset. The headset 30 includes a body 26 and a behind-ear support 28. It also includes a power lead socket 27, by which the headset 30 can be provided with an electrical power connection to a mains charger or other electricity source. The headset 30 also includes a coil location marker 29. The marker 29 is in the form of a circle, as with the markers on the mobile phone 10 of FIG. 1A and the charging mat 20 of FIG. 1B.

Briefly, the mobile phone 10 is able to be charged by placing it upon the upper face 21 of the charging mat. By locating one of the first to third coil location markers 22 to 24 of the charging mat with the induction coil location marker 17 of the mobile phone 10, coupling between an induction coil in the charging mat 20 and an induction coil (shown in other Figures) in the mobile phone 10 can be optimised, thereby allowing optimal transfer of power to the mobile phone 10 for a given induction coil arrangement.

Additionally, an internal battery of the headset 30 is able to be charged by placing the headset onto the upper face 21 of the charging mat 20. In this case, optimal coupling (for a given coil arrangement) between an induction coil (not shown) in the charging mat 20 and an induction coil (not shown) in the headset 30 is achieved by a user arranging the coil location marker 29 of the headset 30 next to a coil location marker 22 to 24 of the charging mat 20.

Additionally, the mobile phone 10 is able to be used in a power transmit mode in which it donates power to the headset 30. Briefly, a user instructs the mobile phone 10 to enter into a power donate mode through a user interface of the phone, following which power can be transmitted by placing the phone 10 and the headset 30 in close proximity, particularly by placing the coil location marker 29 of the headset 30 next to the induction coil location marker 17 of the mobile phone 10. The process is described in more detail below.

Figure 2A:
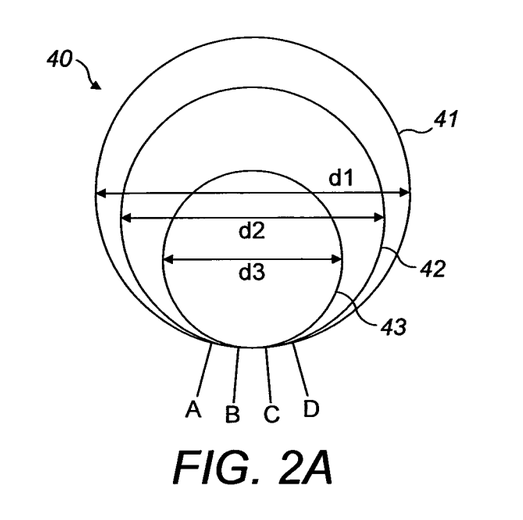
FIG. 2A is a schematic diagram illustrating an induction coil component forming part of the device of FIG. 1A.

FIG. 2A is a drawing illustrating an induction coil 40 forming part of the mobile phone 10. The induction coil 40 includes three sets, each of at least one loop. In the example shown in FIG. 2A, the induction coil arrangement 40 includes a set of large loops 41, a set of intermediate size loops 42 and a set of small loops 43. The induction coil arrangement 40 includes first to fourth taps A to D.

Figure 2B:
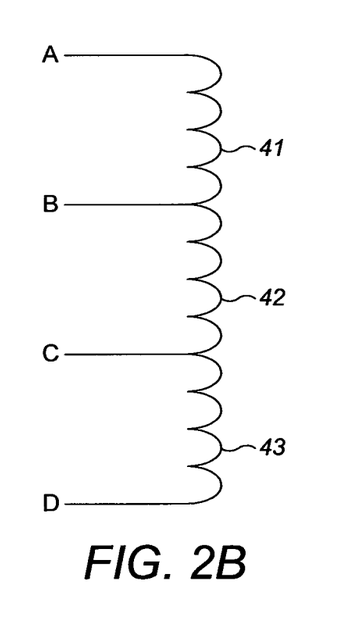
FIG. 2B is a circuit equivalent of the induction coil of FIG. 2A.

As can be seen by FIG. 2B, the first to fourth taps A to D are connected to different ends of the sets of loops 41 to 43. In particular, the taps A and B are connected across the large loops 41, the taps B and C are connected across the intermediate loops 42 and the taps C and D are connected across the small loops 43. An electrical connection is formed between the taps A and D, although this encompasses all three of the loops 41 to 43. Similarly, electrical connections are formed between the taps A and C and between the taps B and D, but each of these connections incorporates at least two loops. In this example, only ones of the taps A to D that are electrically adjacent in the induction coil arrangement 40 are used at any one time.

Each of the loops 41 to 43 of the induction coil arrangement 40 is circular in shape, although they may alternatively have some other shape, for instance rectangular. Each is formed in a plane. Each of the loops 41 to 43 is formed in the same plane, with the small loops 43 being physically located within the coils of the intermediate loops 42, which is physically within the coils of the large loops 41. The first to fourth taps A to D are provided at a part of the circumference of the large loop 41 at which it connects with the intermediate loop 42 and the small loop 43.

The large loop 41 has a diameter d1, which is larger than a diameter d2 of the intermediate loop 42, which is larger than a diameter d3 of the small loop 43. If the loops are non-circular, the diameter refers to a corresponding dimension in the different loops.

The induction coil arrangement 40 is located in the mobile phone 10 such that the sets of loops 41 to 43 are located at the positions of the first to third location markers 18A to 18C respectively. In this way, the location markers 18A to 18C provide users with information about the locations of the sets of loops 41 to 43, facilitating correct alignment of the loops 42 to 43 with induction loops in external devices. Additional information to assist a user in ensuring correct alignment may be provided through a user interface of the device 10.

Each of the sets of loops 41 to 43 of the induction coil arrangement 40 includes one or more loops. In the example shown in FIG. 2B, each of the sets of loops 41 to 43 includes four loops. However, this is purely illustrative and is not limiting. The number of loops that is selected for a set 41 to 43 of a particular design may take into account a number of factors. Different sets of loops 41 to 43 may have different numbers of loops. One or more of the sets of loops 41 to 43 may have only one loop.

Different ones of the sets of loops 41 to 43 are used by the mobile phone 10 according to a mode of operation of power transfer and according to a configuration of a device with which power transfer is required. This is explained in more detail below.

The induction coil arrangement 40, or a similar arrangement including plural sets of loops, may also be used in the charging mat 20.

Figure 3:
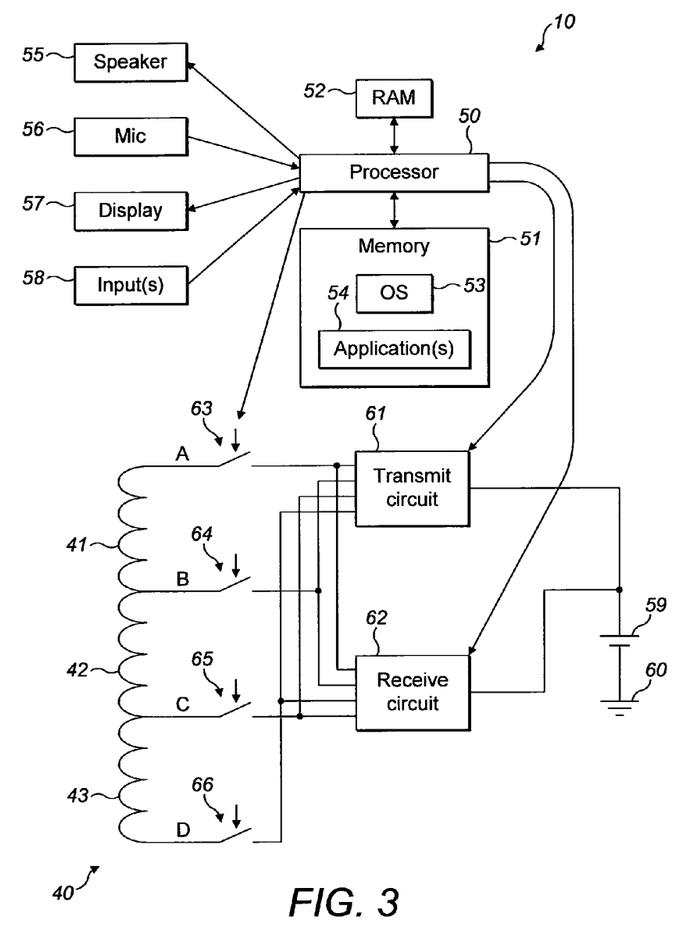
FIG. 3 illustrates components of the device of FIG. 1A and their interconnection.

FIG. 3 is a schematic diagram illustrating components of the mobile phone 10 and their interconnection.

The mobile phone 10 includes a processor 50 that is able to communicate data in both directions between a read only memory (ROM) 51 and a random access memory (RAM) 52. Stored within the ROM 51 is an operating system 53 and one or more applications 54. The operating system 53 and the applications 54 constitute software, which may alternatively be termed computer programs or code. Briefly, the processor 50 operates under control of the software stored in the ROM 51, using the RAM 52 as transient memory, to effect overall control of the mobile phone 10. The processor 50 thus constitutes a controller.

The processor 50 is connected to provide output signals to a speaker 55 and to a display 57. It is connected also to receive inputs from a microphone 56 and from one or more inputs 58. The inputs 58 may be in the form of keys, a touch sensitive component of the display 57, or both.

The processor 50 and the software stored in the memory 51 provide a user interface through which the phone 10 can interact with a user. The user interface also uses output devices including the speaker 55 and display 57 and input devices including the microphone 56 and the inputs 58.

A battery 59 is connected to an internal ground 60. The battery 59 provides electrical power to the relevant components of the mobile phone through a power management chip (not shown). The battery 59 may be able to be charged through a wired connection to a mains charger or some other source of electrical power. The battery 59 is also able to be charged by electrical energy generated by the receive circuit 62, which is able to be provided with power by inductive coupling with the charging mat 20 of FIG. 1B. Electrical power from the battery 59 also is able to be provided to an external device, such as the headset 30, through a transmit circuit 61. Both the transmit circuit 61 and the receive circuit 62 are operated under control of the processor 50.

Each of the transmit circuit 61 and the receive circuit 62 is connected to each of the first or fourth taps A to D of the induction coil arrangement 40. However, the connections are dependent on operation of first to fourth switches 63 to 66, which are operated under control of the processor 50. The first switch 63 is connected between the first tap A and a connection that is commonly coupled to inputs of the transmit circuit 61 and the receive circuit 62. Similarly, the second switch 64 is connected between the second tap B and inputs of the transmit and receive circuit 61, 62. A third switch 65 is connected between the third tap C and third inputs of the transmit and receive circuits 61, 62. Lastly, the fourth switch 66 is connected between the fourth tap D and fourth inputs of the transmit and receive circuits 61, 62.

The processor 50 is operable, under control of the software 53, 54 stored in the memory 51, to activate either the transmit circuit 61 or the receive circuit 62 as required. The transmit circuit 61 and the receive circuit 62 are activated only when it is required to transmit power from the battery 59 to a device or to receive power with which to charge the battery 59 respectively. The transfer of power is effected through the induction coil arrangement 40.

In order to receive inductive power, the processor 50 activates the receive circuit 62 and controls the transmit circuit 61 to sleep. The processor 50 also controls the first to fourth switches 63 to 66 such that the appropriate one of the first to third sets of loops 41 to 43 is connected to the receive circuit 62. In this example, charging of the battery 59 is effected through the large set of loops 41, so the processor 50 controls the first and second switches 63, 64 to be closed and controls the third and fourth switches 65, 66 to be open. Alternatively different ones of the sets of loops 41 to 43 can be connected to the receive circuit 62 by the processor 50 controlling the first to fourth switches 63 to 66 differently.

Operation of the receive circuit 62 is conventional and so is not explained in detail here. When the receive circuit 62 is operational, under control of the processor 50, and energy is incident on the relevant set of loops 41 to 43 of the induction coil arrangement 40, the battery 59 can be charged. Receive power may, of course, also be used to power the components of the mobile phone 10 directly, i.e. without first charging the battery 59.

When so instructed by a user, the mobile phone device 10 is able to provide charging power through the induction coil arrangement 40 for use in charging a battery of another device, for instance the headset 30. In this mode, the processor 50 controls the transmit circuit 61 to be active and controls the receive circuit 62 to be inactive. The processor 50 also controls the first to fourth switches 63 to 66 so as to connect the appropriate ones of the first to third sets of loops 41 to 43 to the transmit circuit 61. For instance, if the small set of loops 43 is required to be used to provide charging power to the headset 30, the processor 50 controls the first and second switches 63, 64 to be open and controls the third and fourth switches 65, 66 to be closed. If, alternatively, the intermediate set of loops 42 is required to be used, the processor 50 controls the first and fourth switches 63, 66 to be open and controls the second and third switches 64, 65 to be closed.

When the mobile phone device 10 is instructed to be in a donation mode, this may be advertised by the device 10, for instance using Bluetooth™. On receiving such an advertisement, the availability of a donating charging device may be indicated through a user interface of the receiving device.

As is explained elsewhere, different ones of the loops 41 to 43 are optimal for different uses. For instance, the large loop 41 is the optimal loop for use when receiving charging power through the charging mat 20. The large loop 41 is optimal in the sense that it is the closest in size to the corresponding induction loop in the charging mat 20, and thus allows the maximum efficiency of power transfer. However, the induction loop included in the headset 30 is smaller, so use of the large loop 41 to transfer power from the mobile phone 10 to the headset 30 would be inefficient. Since the small set of loops 43 is of similar dimensions to the induction coil (not shown) included in the headset 30, the ability of the mobile phone 10 to use the small set of loops 43 to transfer power from the mobile phone 10 to the headset 30 results in improved transfer efficiency, compared to the efficiency that would be experienced if either the large set of loops 41 or the intermediate loops 42 were used instead.

Operation of the mobile phone 10 when providing power to another device, such as the headset 30, will now be described with reference to FIG. 4.

Figure 4:
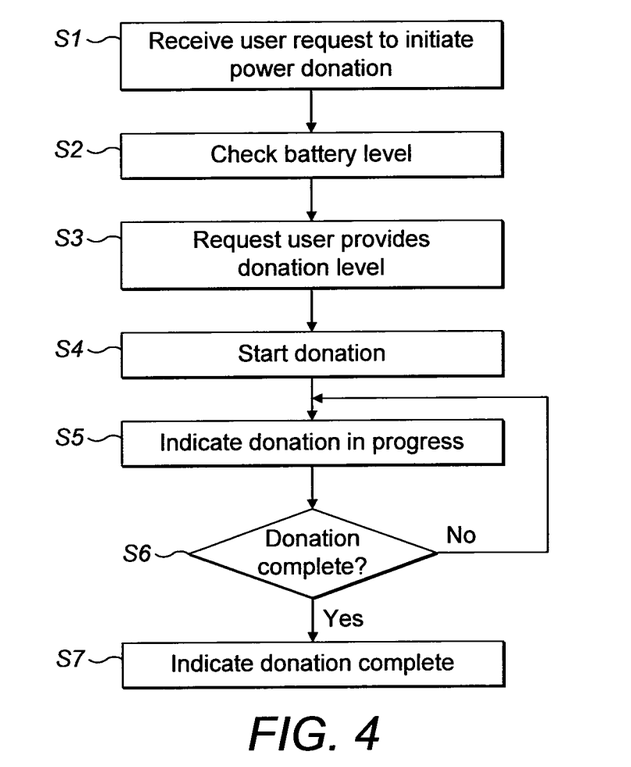
FIG. 4 is a flowchart illustrating operation of the device of FIG. 1A according to certain aspects.

Referring to FIG. 4, the operation begins at step S1 when the phone 10 receives a user request to initiate power donation. This may be achieved in any suitable way. For instance, the user may select an option from a menu system provided by the user interface of the device 10. The user interface may be provided by the operating system 53, or it may be provided by other software that operates with the operating system 53. Alternatively, the request may be provided by a user opening an application 54 that has the specific purpose of managing transfer of power to another device. Alternatively, it can occur through an interface provided by a power transfer application 54. In yet another alternative, it may occur in response to receiving a voice command through the microphone 56.

At step S2, the phone 10 checks the level of the battery 59. This can involve a simple determination of the voltage provided by the battery 59, or may involve information about when the battery was last fully charged and power consumption since that time. This may involve determining whether the battery voltage is above a threshold, for instance 3.5 V. If the phone 10 determines that there is insufficient battery level or power transfer, the operation is ended. Otherwise, the operation proceeds to step S3.

At step S3, the device requests that the user provides information identifying a donation level. For instance, the phone 10 may provide through the user interface, for instance graphically on the display 57, a number of options for the user. These options may include options relating to remaining capacity within the mobile phone 10. Examples include "provide charging power down to 50% remaining capacity", "provide charging power to 30% remaining capacity", "provide charging power down to 10% remaining capacity", or "provide charging power down to a level where emergency call is still possible". Alternatively, the options may relate to a charging level of the power receiving device 30. For instance, the options may include "fully charge the receiving device" and "charge the receiving device to half capacity". Other possible donation levels will be apparent to the skilled person.

At step S4, the mobile phone starts donating electrical power from the battery through the transmit circuit 61 and the induction coil arrangement 40 to the headset 30. This involves control of the transmit circuit and the first to fourth switches 63 to 66 as described above.

At step S5, the mobile phone 10 indicates that power donation is in progress. This can be achieved in any suitable way, for instance through a suitable graphic on the display 57 or through the use of a blinking LED indicator. Optionally, the phone 10 also indicates the progress of the power donation, for instance in terms of percentage complete.

At step S6, it is determined by the phone 10 whether the donation is complete. If it is not, the operation proceeds again to step S5. Here, the progress may be updated. Once step S6 determines the donation is complete, at step S7 the phone indicates to the user that the power donation is complete. This may involve providing suitable graphical information on the display 57, and may additionally include an audio output provided through the speaker 55.

The phone 10 may determine which of the first to third sets of loops 41 to 43 is the optimal loop to use having regard to a target power receiving device, such as the headset 30, in any suitable way. In some embodiments, the mobile phone 10 enters into data communication with the headset 30, for instance using Bluetooth. Once communication has been established, the mobile phone 10 sends a request to the headset 30 for information identifying the size of type of induction coil (not shown) that is included in the headset 30. The headset 30 then responds with information identifying the size or type of its induction coil, which is received by the mobile phone 10. The mobile phone 10 then uses this information to determine which of the sets of loops 41 to 43 is best having regard to the induction loop included in the headset, and controls the first to fourth switches 63 to 66 accordingly. The best one of the first to third loops 41 to 43 to use is the one that has the diameter that is closest matched to the diameter of the induction loop included in the headset 30.

The establishment of a connection between the mobile phone 10 and the headset 30 also enables the mobile phone 10 to request information about a charge level of a battery (not shown) included in the headset 30. The mobile phone 10 may also be configured to request information about the capacity of the battery forming part of the headset 30. Using the charge level and optionally also the battery capacity information received from the headset, the mobile phone 10 is able to estimate how much of the charge stored in the battery 59 is needed in order to meet the user's request for a donation level, particularly if the donation level is defined in terms of a certain charge in the headset 30.

The establishment of communication between the mobile phone 10 and the headset 30 also allows the mobile phone 10 to signal to the headset 30 when the power transfer has been completed. In response to receiving such a signal, the headset 30 may provide an indication that it is no longer charging. This may be in the form of a visual indicator, or both. Whether or not the headset 30 establishes communication with the mobile phone 10, the headset 30 may provide an indication that it is being charged, for instance through the use of a blinking LED indicator.

Advantageously, the headset 30 is configured to be powered off or enter a sleep mode, such as to minimise power consumption during the charging process.

The hardware, operation and principles described above allow a device, such as the mobile phone 10, to use internally stored electrical energy to be provided for charging or powering another device 30, such as the headset 30. Moreover, the provision of power to the other device can be relatively efficient even given different possible induction coil configurations for the target device 30. Efficient power transfer to other device is particularly important considering the limited electrical energy that is stored within the donating device, and considering the potential uses to which the donated device can put the stored electrical energy.

The features described above also allow more optimal power transfer to the device, such as the mobile phone 10, from a non-portable charging apparatus, such as the charging mat 20, even if there may be a number of different possible configurations for the size of the induction coil of the charging device 20. Although the efficiency of transfer may not be so critical in this case, optimising the efficiency of power transfer may allow the device, such as the mobile 10, to be charged in a reduced charging interval compared to when a non-optimal induction coil is used to receive power from the charging device 20.

Although in the above the induction coil arrangement 40 is shown as having three sets of loops 41 to 43, it will be appreciated that other numbers of sets of loops may instead be used. For instance, in other embodiments the conductor coil arrangement 40 includes only two sets of loops. Here, a larger set of loops may be selected to have a diameter of approximately equal to a diameter commonly used for charging mats or pads 20, with the diameter of the smaller set of loops being selected such as to be about equal to a typical induction coil loop diameter used in accessory devices such as headsets, digital pens etc.

As well as being usable for charging accessory devices 30, the mobile phone 10 may also be used to donate power to non-accessory devices. For instance, the mobile phone 10 may provide power to another device of the same or similar configuration as the mobile phone 10. In this case, the one of the sets of loops 41 to 43 that is selected to be used for transmission may depend on the one of the sets of loops in the receiving device that is selected for receiving power. In the case of identical configurations, the devices are configured to select one of the loops 41 to 43 that provides the optimal power efficiency, namely the larger loop 41.

The features described above can allow a user of a device, such as the mobile phone 10, to donate power from the battery of their device to charge the devices of their friends and family members. This increases the social usability of the mobile phone 10.

In the above, a processor 50 is said to act as a controller in performing the stated functions and controlling the other components of the device 10. The controller may instead take any suitable form. For instance, it may comprise processing circuitry, including one or more processors, and a storage device, comprising a single memory unit or a plurality of memory units. The processing circuitry may be any type of processing circuitry. For example, the processing circuitry may be a programmable processor that interprets computer program instructions and processes data. The processing circuitry may include plural programmable processors. Alternatively, the processing circuitry may be, for example, programmable hardware with embedded firmware. The processing circuitry may be a single integrated circuit or a set of integrated circuits (i.e. a chipset). The processing circuitry may also be a hardwired, application-specific integrated circuit (ASIC). The processing circuitry may be termed processing means. The storage device may store computer program instructions that, when loaded into processing circuitry, control the operation of the device 10. The computer program instructions may provide the logic and routines that enables the apparatus to perform the functionality described above, and also to perform the method described below with reference to FIG. 4.

The software 53, 54 may arrive at the device via an electromagnetic carrier signal or be copied from a physical entity such as a computer program product, a memory device or a record medium such as a CD-ROM or DVD. The software 53, 54 may alternatively be provided over-the-air, as an operating system, firmware or application update or download.

The above embodiments are not limiting on the scope of the claims, and various alternatives will be apparent to the skilled person. For instance, in some embodiments the back cover 16 supports the coil arrangement 40 and/or the transmit circuit 61 or the receive circuit 62.

The invention claimed is:

1. Apparatus comprising: an induction coil arrangement, the induction coil arrangement having a first set of at least one coil with a first diameter and a second set of at least one coil with a second diameter, the second diameter being different to the first diameter, a first tap connected at a first end of the first set, a second tap connected at connection common to a second end of the first set and a first end of the second set, and a third tap connected at a second end of the second set;
   a power transmit arrangement selectively connectable to a first combination of two of the first to third taps; and
   a power receive arrangement selectively connectable to a second combination of two of the first to third taps, the second combination being different to the first combination.

2. Apparatus as claimed in claim 1, comprising a controller configured to control switches connected between the power transmit arrangement and the power receive arrangement and the taps of the induction coil arrangement.

3. Apparatus as claimed in claim 2, wherein the controller is configured to respond a user input indicating that power transmission is required to activate the power transmit arrangement and to control the switches so as to connect the power transmit arrangement to the first combination of two of the first to third taps.

4. Apparatus as claimed in claim 1, wherein the taps of the first combination are electrically adjacent to one another in the induction coil arrangement, and wherein the taps of the second combination are electrically adjacent to one another in the induction coil arrangement.

5. Apparatus as claimed in claim 1, wherein the induction coil arrangement additionally includes a third set of at least one coil with a third diameter, the third diameter being different to either of the first and second diameters, a first end of the third set being connected to the third tap and a second end of the third set being connected to a fourth tap, and wherein the power transmit arrangement and/or the power receive arrangement is selectively connectable to a third combination of two of the first to fourth taps, the third combination being different to the first and second combinations.

6. A portable communications device comprising apparatus as claimed in claim 1.

7. A method of operating apparatus comprising:
   an induction coil arrangement, the induction coil arrangement having a first set of at least one coil with a first diameter and a second set of at least one coil with a second diameter, the second diameter being different to the first diameter, a first tap connected at a first end of the first set, a second tap connected at connection common to a second end of the first set and a first end of the second set, and a third tap connected at a second end of the second set;
   a power transmit arrangement; and
   a power receive arrangement, the method comprising:
   in response to receiving a user input indicating that power transmission is required:
     a) connecting the power transmit arrangement to a first combination of two of the first to third taps;
     b) operating, with a processor, the power transmit arrangement; and
     c) refraining from activating the power receive arrangement.

8. A method as claimed in claim 7, further comprising:
   receiving a user input indicating one or more parameters for power transmission;
   monitoring power transmission;
   detecting that the parameters for power transmission have been reached; and
   in response to the detection, de-activating the power transmit arrangement.

9. A method as claimed in claim 8, wherein the one or more parameters for power transmission include a target battery charge level.

10. A method as claimed in claim 7, further comprising indicating charging progress through a user interface.

11. A method as claimed in claim 7, further comprising, in response to determining that inductive power reception is required:
   a) connecting the power receive arrangement to a second combination of two of the first to third taps, the second combination being different to the first combination;
   b) operating the power receive arrangement; and
   c) refraining from activating the power transmit arrangement.

12. A method as claimed in claim 7, comprising establishing communication between the apparatus and an external device, and using information received from the external device in controlling the power transmit arrangement.

* * * * *